(12) United States Patent
Menochet et al.

(10) Patent No.: US 10,118,342 B2
(45) Date of Patent: Nov. 6, 2018

(54) WELDED STRUCTURAL JOINT BETWEEN A HIGH-PERFORMANCE THERMOPLASTIC MATRIX COMPOSITE MATERIAL AND AN ELASTOMER BY POWDER FUNCTIONALIZATION

(71) Applicant: AIRBUS DEFENCE AND SPACE SAS, Les Mureaux (FR)

(72) Inventors: Audrey Menochet, Le Bouscat (FR); Christophe Colin, St Medard en Jalles (FR)

(73) Assignee: ARIANEGROUP SAS, Paris (FR)

( * ) Notice: Subject to any disclaimer, the term of this patent is extended or adjusted under 35 U.S.C. 154(b) by 459 days.

(21) Appl. No.: 14/781,580

(22) PCT Filed: Mar. 25, 2014

(86) PCT No.: PCT/EP2014/055924
§ 371 (c)(1),
(2) Date: Sep. 30, 2015

(87) PCT Pub. No.: WO2014/161745
PCT Pub. Date: Oct. 9, 2014

(65) Prior Publication Data
US 2016/0059479 A1 Mar. 3, 2016

(30) Foreign Application Priority Data
Apr. 3, 2013 (FR) ...................... 13 52987

(51) Int. Cl.
*B29C 65/34* (2006.01)
*B29C 65/00* (2006.01)
(Continued)

(52) U.S. Cl.
CPC ............ *B29C 66/712* (2013.01); *B29C 65/20* (2013.01); *B29C 65/344* (2013.01);
(Continued)

(58) Field of Classification Search
CPC ............... B29C 66/712; B29C 66/1122; B29C 66/3034; B29C 66/45; B29C 66/71;
(Continued)

(56) References Cited

U.S. PATENT DOCUMENTS 1,875,552 A * 9/1932 Bateman ............... B29C 33/722
134/40
3,783,061 A 1/1974 Hahn
(Continued)

FOREIGN PATENT DOCUMENTS

DE 27 46 544 A1 4/1979
EP 0 440 410 A2 8/1991
(Continued)

OTHER PUBLICATIONS

Machine translation of Japanese Patent 6-47816, date unknown.*
(Continued)

*Primary Examiner* — Jeffry H Aftergut
(74) *Attorney, Agent, or Firm* — Im IP Law; C. Andrew Im

(57) ABSTRACT

A method for producing, by welding, a joint between a thermoplastic matrix composite material and an elastomeric material. The elastomeric material is functionalized by forming a thin layer of elastomeric material incorporating particles of thermoplastic material and melting the thin layer onto the surface of the elastomeric material during the pressure-vulcanization of the elastomer. The functionalized surface of the elastomeric material is welded to the thermoplastic material of the composite. The welding operation includes interposing a metal fabric coated with thermoplastic material between the surfaces of the elastomer and the composite that are welded to each other, and passing an electric current through same, resulting in the surface melting of the two materials.

14 Claims, 2 Drawing Sheets

(51) Int. Cl.
| | |
|---|---|
| B29C 65/48 | (2006.01) |
| B29C 65/50 | (2006.01) |
| C08J 5/12 | (2006.01) |
| C08J 5/24 | (2006.01) |
| B32B 25/08 | (2006.01) |
| B32B 25/10 | (2006.01) |
| B32B 27/08 | (2006.01) |
| B32B 27/12 | (2006.01) |
| B32B 27/18 | (2006.01) |
| B32B 27/28 | (2006.01) |
| B29C 65/20 | (2006.01) |
| B29C 65/36 | (2006.01) |
| B29L 31/30 | (2006.01) |
| B29C 65/02 | (2006.01) |
| B29C 35/02 | (2006.01) |
| B29K 71/00 | (2006.01) |
| B29L 7/00 | (2006.01) |
| B29L 9/00 | (2006.01) |

(52) U.S. Cl.
CPC .......... *B29C 65/348* (2013.01); *B29C 65/364* (2013.01); *B29C 65/486* (2013.01); *B29C 65/4815* (2013.01); *B29C 65/4835* (2013.01); *B29C 65/5021* (2013.01); *B29C 65/5057* (2013.01); *B29C 66/1122* (2013.01); *B29C 66/45* (2013.01); *B29C 66/721* (2013.01); *B29C 66/7212* (2013.01); *B29C 66/7392* (2013.01); *B29C 66/73751* (2013.01); *B29C 66/73752* (2013.01); *B29C 66/73755* (2013.01); *B29C 66/742* (2013.01); *B29C 66/7465* (2013.01); *B29C 66/81455* (2013.01); *B32B 25/08* (2013.01); *B32B 25/10* (2013.01); *B32B 27/08* (2013.01); *B32B 27/12* (2013.01); *B32B 27/18* (2013.01); *B32B 27/281* (2013.01); *C08J 5/121* (2013.01); *C08J 5/24* (2013.01); *B29C 35/02* (2013.01); *B29C 65/02* (2013.01); *B29C 66/02* (2013.01); *B29C 66/02245* (2013.01); *B29C 66/71* (2013.01); *B29C 66/919* (2013.01); *B29C 66/91443* (2013.01); *B29C 66/91645* (2013.01); *B29C 66/91655* (2013.01); *B29C 66/949* (2013.01); *B29C 2035/0211* (2013.01); *B29K 2071/00* (2013.01); *B29K 2995/0005* (2013.01); *B29K 2995/0046* (2013.01); *B29K 2995/0087* (2013.01); *B29L 2007/008* (2013.01); *B29L 2009/00* (2013.01); *B29L 2031/3097* (2013.01); *B32B 2260/021* (2013.01); *B32B 2260/046* (2013.01); *B32B 2262/101* (2013.01); *B32B 2262/103* (2013.01); *B32B 2307/304* (2013.01); *B32B 2307/306* (2013.01); *C08J 2300/22* (2013.01)

(58) Field of Classification Search
CPC .............. B29C 66/721; B29C 66/7212; B29C 66/73755; B29C 66/7392; B29C 66/7465; B29C 66/81455; B29C 65/20; B29C 65/344; B29C 65/346; B29C 65/348; B29C 65/364; B29C 65/4815; B29C 65/5021; B29C 65/5028; B29C 65/5057
See application file for complete search history.

(56) References Cited

U.S. PATENT DOCUMENTS

| | | | | |
|---|---|---|---|---|
| 4,744,851 | A  * | 5/1988 | Lorenz ................... | B29C 33/68 156/247 |
| 5,122,420 | A  * | 6/1992 | Baron .................... | B32B 25/08 428/474.4 |
| 6,461,455 | B1 * | 10/2002 | Meatto ................ | B29C 35/0272 156/273.7 |
| 2002/0038687 | A1* | 4/2002 | Anderson ........... | B29C 65/5042 156/275.7 |
| 2010/0310873 | A1* | 12/2010 | Sullivan ................. | B29C 73/02 428/411.1 |

FOREIGN PATENT DOCUMENTS

| | | |
|---|---|---|
| GB | 1 579 433 A | 11/1980 |
| JP | H06 134870 A | 5/1994 |
| JP | 6-47816 A  * | 8/1994 |
| WO | 2008/147955 A1 | 12/2008 |

OTHER PUBLICATIONS

Machine translation of German Patent 2746544, date unknown.*
Michael J. Troughton, "Handbook of Plastics Joining," 2008, Second Edition, William Andrew Inc., Norwich, New York.

* cited by examiner

WELDED STRUCTURAL JOINT BETWEEN A HIGH-PERFORMANCE THERMOPLASTIC MATRIX COMPOSITE MATERIAL AND AN ELASTOMER BY POWDER FUNCTIONALIZATION

RELATED APPLICATIONS

This application is a § 371 application from PCT/EP2014/055924 filed Mar. 25, 2014, which claims priority from French Patent Application No. 13 52987 filed Apr. 3, 2013, each of which is herein incorporated by reference in its entirety.

FIELD OF THE INVENTION

The invention relates to the field of structural chemical assemblies from dissimilar materials, and more precisely assembly of elastomeric materials with thermoplastic materials.

Speaking quite generally, the term thermoplastic material is used here to describe any material comprising a certain percentage of thermoplastic material constituting a matrix, whether it is a material consisting solely of thermoplastic material or for example a composite material with continuous fibers and a thermoplastic matrix.

The invention finds particular application, for example, in the context of the fabrication of propulsion stages of powder rockets, for joining the tank to the skirts.

BACKGROUND OF THE INVENTION

Assembly of two high-performance thermoplastic matrix composites by welding generally involves the use of known assembly techniques. Moreover, in order to heat the assembly zone to the desired temperature, it is possible to employ several known principles of heating such as heating by hot gas (stove, autoclave), by vibration (ultrasound, rotation), by induction, by resistance, etc. This type of assembly is notably described in the book by Michael J. Troughton with the title "Handbook of plastics joining" (Plastics Design Library). ISBN: 978-1-884207-17-4.

Conversely, to date, there is no known means for assembly of a thermoplastic matrix composite and a material of the elastomer type by welding. This absence seems to have its origin in the fact that since the elastomers do not have the property of passing reversibly from the solid state to the molten state, an assembly technique requiring heating of the materials to be assembled, at least at the level of the assembly zone, does not seem obvious to a person skilled in the art.

For certain applications, the known assembly techniques, allowing assembly of an element made of thermoplastic material with an element made of polymer material, do not give the required qualities, notably in terms of mechanical durability.

This is the case for example, as illustrated schematically in FIG. 1, for assembly of a shroud 11 (of metallic material or composite with thermoplastic or thermosetting matrix) on a tank 12 of thermoplastic matrix composite to constitute a propulsion stage of a powder launch vehicle, or a consumer gas tank.

In fact this assembly requires the insertion of a layer 13 of elastomeric material within the link, said layer of elastomeric material having the role of absorbing the large differential strains that develop between the two structures. Therefore insertion of this interposed layer 13 of elastomeric material requires assembling this layer on the two elements of composite material that constitute the tank 12 and the shroud 11, and said assembly must necessarily be of high mechanical quality, owing to the stresses imposed on the assembly.

Now, in terms of mechanical durability, a welded link is generally superior to a glued link. In fact, after welding, there is no longer a differentiated interface between the two assembled parts, owing to diffusion of molecules from one part to the other, whereas in the case of a glued link, there are as many interfaces as there are layers required for creating the link, said layers mainly including, besides the layer of adhesive proper, the adhesion primers, as well as the treatments applied on the surfaces to be assembled.

Moreover, in the case of welding, we also no longer have the constraints due to preparation of the surfaces before assembly and protection of them against contaminants, these operations being necessary, or even imperative, in the case of assembly by gluing.

OBJECT AND SUMMARY OF THE INVENTION

One aim of the invention is to propose a solution for performing structural assembly by welding of a thermoplastic material and an elastomeric material, attention being focused on these two classes of materials.

Accordingly, the invention relates to a method for making a welded structural joint between a thermoplastic matrix composite and an elastomer, said method comprising the following operations:
- a first operation of functionalization of the elastomeric material by incorporating a given proportion of powder of a thermoplastic material in the raw elastomeric material, functionalization being carried out by producing a thin layer of raw elastomeric material incorporating a proportion of powder of thermoplastic material and fusion of said layer with the main layer of elastomeric material during the operation of vulcanization of said elastomeric material under pressure;
- a second operation of welding proper, during which the thermoplastic composite material is welded to the functionalized layer of elastomeric material.

According to various particular arrangements, which may be considered jointly, the method according to the invention may in addition have the following features.

According to a particular arrangement, the operation for producing the functionalized elastomer itself comprises several steps:
- a preliminary step A) of cleaning the various parts of the vulcanizing mold used;
- a first step B) during which a prefunctionalized thin layer of raw elastomer is prepared by incorporating a given proportion of powder of thermoplastic material homogeneously in this layer of elastomer;
- a second step C) during which the prefunctionalized thin layer of raw elastomer is applied on the surface of the elastomeric material;
- a third step D) during which vulcanization of the elastomeric material under pressure is carried out; the pressure applied being such that the prefunctionalized thin layer of raw elastomer becomes incorporated, at least at the surface, in the main layer of elastomeric material during the vulcanizing process.

According to another particular arrangement, the thermoplastic material incorporated in the thin layer of elastomeric material is selected so that it is both able to be welded to the thermoplastic material forming the matrix of the composite material and to display good compatibility with the elastomeric material.

According to a variant of the preceding arrangement, the thermoplastic material incorporated in the thin layer of elastomeric material is identical to the thermoplastic material forming the matrix of the composite material.

According to another variant of the same preceding arrangement, the composite material being a carbon/polyetheretherketone composite and the elastomeric material being of the HNBR type, the thermoplastic material incorporated in the thin layer of elastomeric material is a polyetherimide.

According to another particular arrangement, the thermoplastic material is incorporated in the elastomeric material in the form of particles with a diameter between 20 µm and 60 µm, in a proportion between 10% and 25% of the mixture by weight.

According to another particular arrangement, the operation of welding II) consists of heating the faying surfaces of the two materials to be welded by interposing, between these two surfaces, a woven metal wire cloth which performs the function of heating resistance, the woven metal wire cloth itself being impregnated with thermoplastic material.

According to a variant of the preceding arrangement, the welding operation is preceded by a preliminary operation I) of preparation of the surfaces of the materials to be assembled, and said operation may, depending on the state of these surfaces, consist either of a simple degreasing using a suitable solvent, or fine grinding of the functionalized surface of the element made of elastomer, followed by cleaning the surfaces with the same solvent.

According to another particular arrangement, the composite material being a carbon/polyetheretherketone composite and the elastomeric material being of the HNBR type, step C) of production proper of the functionalized elastomer comprises the following operations:
a) a first operation of placing the following elements on the bottom plate of the vulcanizing mold:
  two superposed layers of Teflon-coated glass cloth;
  a sheet of raw elastomeric material in which polyetherimide powder has been incorporated;
  the sheets of unvulcanized raw elastomeric material;
  a set of edging blocks;
  two superposed layers of Teflon-coated glass cloth;
  the whole being covered with the top plate of the vulcanizing mold;
b) a second operation of placing the stack prepared on the plate of a heating press preheated to a temperature $\theta_2$ of 140° C.;
c) a third operation of hot pressing of the stack, during which the nominal pressing cycle appropriate to the elastomer in question is applied;
d) a fourth operation during which the mold is removed from the press while the latter maintains the temperature $\theta_2$ of 140° C., the functionalized elastomer is removed from the mold and is left to cool to room temperature.

According to a variant of the preceding arrangement, the pressing cycle in the third operation comprises:
  a phase of gradual increase in temperature up to a high temperature $\theta_1$ of 230° C. at a gradient of 2.5° C./min,
  a phase of holding at the temperature $\theta_1$ for 10 minutes,
  a phase of temperature decrease to the temperature $\theta_2$ of 140° C. at a gradient of 2.5° C./min.

According to another particular arrangement, the composite material being a carbon/polyetheretherketone composite and the elastomeric material being of the HNBR type, the operation of welding proper II) comprises the following steps:
a) A first step of setting up, during which mainly the following elements are arranged, in the order shown, on a plate of heat-insulating material:
  a first film of heat-resistant polyimide,
  the functionalized elastomeric material,
  a first film of polyetherimide,
  a woven metal wire cloth preimpregnated with polyetherimide,
  a second film of polyetherimide,
  the thermoplastic composite material,
  a second polyimide film,
  a layer of heat-insulating material,
  glass cloth;
b) A second step during which a bladder is produced under vacuum with a polyimide film arranged so as to allow the woven metal wire cloth to stand out, hermeticity of said bladder being ensured by means of high-temperature mastic.
c) A third step during which the bladder is placed under vacuum, an electric power supply unit is connected to the woven metal wire cloth and different values of current are applied according to an appropriate cycle.
d) A fourth step during which the polyimide film serving as vacuum enclosure is removed and the stack is dismounted.

According to a variant of the preceding arrangement, during the third step, a current of 15.6 A is applied to the woven metal wire cloth for 200 seconds and then a current of 10 A for 100 seconds.

BRIEF DESCRIPTION OF THE DRAWINGS

The features and advantages of the invention will be better understood from the description that follows, which is based on the appended figures, in which.

DETAILED DESCRIPTION OF THE EMBODIMENTS

Figure 1:
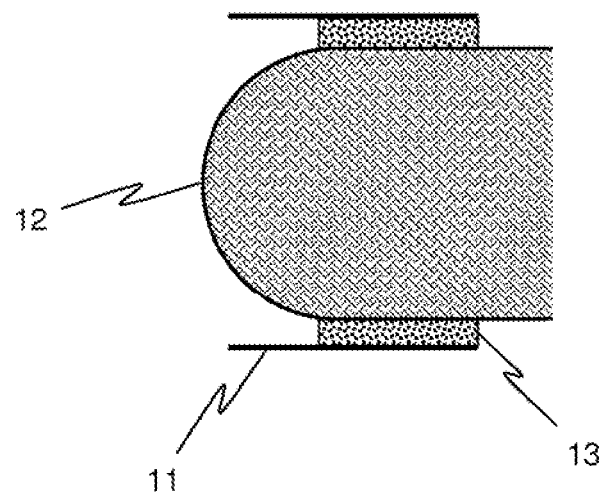
FIG. 1 is a schematic illustration of an example of a structure for which assembly of the different elements by welding seems particularly suitable, in view of the mechanical stresses imposed on said assembly.

The principle of the method according to the invention consists mainly of carrying out an operation of preparation of the elastomeric material, before welding proper. This operation consists of assembling, at the "raw elastomer" stage, i.e. unvulcanized, two separate layers of elastomeric material: a first layer, or main layer, of homogeneous raw elastomeric material, and a so-called "prefunctionalized" second layer. The functionalization operation consists here of modifying the surface, or the actual core, of the elastomer in order to endow it with the necessary properties so that it can be welded to the thermoplastic composite material. "Functionalize the elastomeric material" means modify the composition of the surface layers of this material by incorporating a thermoplastic material therein.

For this purpose, to produce the so-called "functionalized" first layer, a given proportion of powder of a thermoplastic material having both compatibility with the elastomeric material and being weldable to the matrix of the thermoplastic composite material to which we wish to assemble the elastomeric material in question, is introduced into this layer of raw elastomeric material.

Compatibility between the elastomeric material and the thermoplastic material forming the powder incorporated in this material mainly means, in this case, physicochemical compatibility between the two materials. This compatibility is reflected in possible interaction between the thermoplastic material of the powder incorporated and the elastomer in which this powder is incorporated, an interaction that a person skilled in the chemistry of plastics is able to characterize by specific criteria, which are rather of a chemical nature: wettability, mutual diffusion between the materials, chemical bonds.

However, we are also interested in compatibility of application between the different materials (physical compatibility), notably regarding the need to be able to hot-vulcanize the elastomer thus functionalized but without causing degradation of the thermoplastic material incorporated in the form of powder.

According to the invention, the process for producing the functionalized elastomer comprises several steps:

A) a preliminary step of cleaning the various parts of the vulcanizing mold, said cleaning being carried out for example with methyl ethyl ketone (or MEK).

B) a first step during which a thin layer of raw elastomeric material is prepared, prefunctionalized by incorporating a given proportion of powder of thermoplastic material, homogeneously in this layer of elastomer.

According to the invention, the proportion of powder is determined by carrying out mechanical testing on peeling test specimens, adjusting said proportion so as to obtain the desired value of peel strength, with a value equal to at least 20 N/mm.

Moreover, the granulometry of the powder is in its turn selected so as to facilitate mixing with the elastomer.

Also according to the invention, the various constituents of the raw elastomer, constituted for example of process oil-based rubber and silica fillers, and the proportion of powder of thermoplastic material are mixed in a closed mixer of the Werner type. The peroxide vulcanizing agent is then added to the open mixer. The last step consists of calendering the functionalized raw elastomer thus obtained, so as to produce the thin layer with the desired thickness.

C) a second step during which the prefunctionalized layer of raw elastomer is applied on the surface of the raw elastomeric material to be assembled with the thermoplastic composite material and, D) a third step during which vulcanization of the elastomeric material under pressure is carried out. According to the invention, the pressure applied is determined such that the two layers of elastomeric material fuse at the surface during the vulcanizing process.

A vulcanized functionalized elastomer is obtained comprising a conventional elastomer base covered with a layer of functionalized elastomer of small thickness, a layer with a thickness of 1 mm for example.

Figure 2:
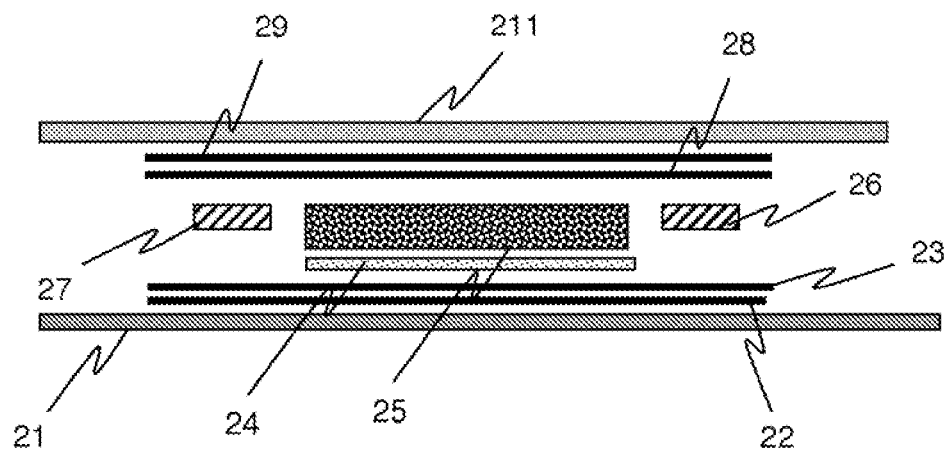
FIG. 2 is an illustration of an embodiment example of the elastomer functionalization step of the method according to the invention.

Thus, for example, in a particular embodiment of the invention, more particularly suitable for welding a composite material with a matrix of polyetheretherketone (PEEK) and with carbon fiber reinforcement (carbon/PEEK thermoplastic composite) to an elastomer of the type of hydrogenated nitrile rubbers (hydrogenated butadiene-acrylonitrile), or Buna or else HNBR (hydrogenated nitrile butadiene rubber), step C) of production proper of the functionalized elastomer may itself comprise the following operations:

a) A first operation of setting up, on the bottom plate 21 of the vulcanizing mold, the elements necessary for carrying out functionalization of the elastomeric material, namely in the following order, and as illustrated in FIG. 2:

two superposed layers 22 and 23 of Teflon-coated glass cloth, whose role consists of allowing mold release of the elastomer after polymerization;

the layer of raw elastomer 24 in which polyetherimide powder (or PEI) has been incorporated. The powder selected is a PEI powder, Ultem® 1000 for example, which has a median diameter between 20 µm and 60 µm, a diameter of 45 µm for example. As for the proportion of powder incorporated, it has a value between 10% and 25% of the total mixture by weight, a value roughly equal to 20% for example.

the sheets of raw elastomeric material (HNBR) 25 (unvulcanized), to be functionalized, a set of edging blocks 26, 27, blocks of type 304L stainless steel for example, two superposed layers 28 and 29 of Teflon-coated glass cloth, performing a role similar to that provided by layers 22 and 23.

After setting up, the whole is covered with the top plate 211 of the vulcanizing mold so that all the elements listed above are positioned between the bottom plate 21 and the top plate 211 of the mold;

b) a second operation of placing the stack prepared on the plate of a heating press preheated to a temperature $\theta_2$ of 140° C.;

c) a third operation of hot pressing of the stack, during which the nominal pressing cycle appropriate to the elastomer in question is applied, said cycle comprising:

a phase of gradual increase in temperature up to a high temperature $\theta_1$ (230° C. at 2.5° C./min), a phase of holding at the temperature $\theta_1$ (230° C. plateau for 10 minutes), a phase of temperature decrease to the temperature $\theta_2$ (140° C. at 2.5° C./min);

d) a fourth operation during which the mold is removed from the press while the latter maintains the temperature $\theta_2$ (140° C.), the functionalized elastomer is removed from the mold and is left to cool to room temperature.

As already stated above, a surface-functionalized vulcanized elastomer is thus obtained, comprising a conventional elastomer base having a surface layer of functionalized elastomer 24 formed from a mixture of elastomer and thermoplastic material.

In a particular embodiment, the thermoplastic material used for carrying out the operation of functionalization of the elastomer is selected to be the same material as that which constitutes the matrix of the composite material to which the elastomeric material is to be welded. However, it should be noted that the thermoplastic material used may be different, notably to better satisfy the dual requirement of good adhesion of the two thermoplastic materials (i.e. that of the composite material and that used for functionalization of the elastomer) and of good compatibility of the material used for functionalization of the elastomer and of the elastomeric material itself.

Once the polymer material is functionalized, the method according to the invention continues with the welding step proper, an operation which, owing to the functionalization of the polymer material, takes place advantageously similarly to an operation of welding of two parts made of thermoplastic matrix composite. This operation may notably be carried out by induction or by resistance.

It should be noted that, advantageously, the welding operation is not subject to any constraint of delay in being carried out, in contrast to what may happen in the case of assembly by gluing. Since the functionalized elastomeric material is vulcanized before assembly, welding of the two materials may thus be carried out at the time that is considered to be the most suitable, which may be a varying length of time after completion of functionalization.

The resistance method consists of local heating of the interface between the composite material and the functionalized elastomer, to obtain a bond between the thermoplastic matrix of composite material and the thermoplastic part of the functionalized elastomer.

According to the invention, the welding step begins with a preliminary operation I) of preparation of the surfaces to be assembled. Depending on the state of these surfaces, preparation may consist of simple degreasing using a suitable solvent, ethanol for example, or fine grinding of the functionalized surface of the element made of elastomer, with SiC paper abrasive of 400 grain for example, followed by cleaning the surfaces and in particular the ground surface, using the same solvent. Here, "suitable solvent" means a solvent of fats, which by its nature or its composition does not present any risk of causing dissolution of the material itself.

There then follows the operation II) of welding proper, consisting of heating the faying surfaces of the two materials to be welded by interposing, between these two surfaces, a woven metal wire cloth, which performs the function of heating resistance; said operation being carried out under vacuum.

According to the invention, the woven metal wire cloth is itself impregnated with thermoplastic material, PEI for example.

Figure 3:
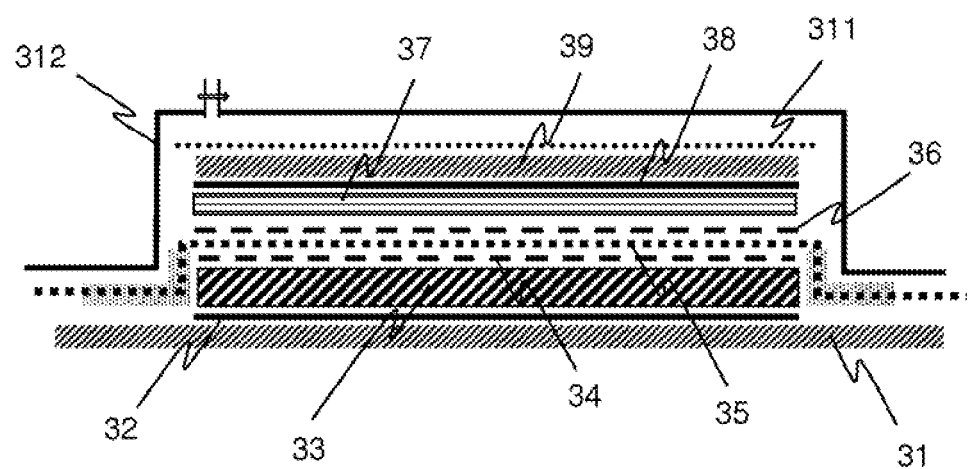
FIG. 3 is an illustration of an embodiment example of the welding operation according to the invention.

Thus, for example, in a particular embodiment of the invention, more particularly suitable for welding a composite material with a PEEK matrix and with carbon fiber reinforcement (carbon/PEEK thermoplastic composite) to an elastomer of the HNBR type (Buna), operation II) of welding proper may itself comprise the following steps:

a) A first step of setting up, during which, as illustrated in FIG. 3, mainly the following elements are arranged, in the order shown, on a plate 31 of heat-insulating material, NL FIH for example:
   a first film 32 of heat-resistant polyimide, preferably a film of Upilex®, intended to promote disassembly of the assembly after welding,
   the functionalized elastomeric material 33,
   a first film 34 of polyetherimide (PEI), of the type Ultem® 1000 for example,
   a woven metal wire cloth 35 preimpregnated with PEI, for example a cloth of reference 102083 manufactured by the company Gantois,
   a second film 36 of polyetherimide (PEI),
   the thermoplastic composite material 36 (C/PEEK) coated with PEI,
   a second film 37 of polyimide Upilex also intended to promote disassembly of the assembly after welding,
   a layer of heat-insulating material 38 (NL FIH),
   glass cloth 311, of the type E5555 for example, intended to promote drainage of the air present.
b) A second step during which a bladder is produced under vacuum with a film 312 of polyimide (Thermalimide) arranged so as to allow the woven metal wire cloth impregnated with PEI to stand out; hermeticity being obtained with a high-temperature mastic A800 3G.
c) A third step during which the bladder 312 thus produced is placed under vacuum, an electric power supply unit is connected to the woven metal wire cloth 35 and different values of current are applied according to an appropriate cycle: for example 15.6 A for 200 seconds and then 10 A for 100 seconds.
d) A fourth step during which the polyimide film 312 serving as vacuum enclosure is removed and the stack is dismounted, so as to recover the elastomer-thermoplastic composite assembly thus produced.

The invention claimed is:

1. A method for producing a welded structural joint between a thermoplastic matrix composite and an elastomer, comprising the steps of:
   providing a functionalized elastomeric material layer by incorporating a predetermined proportion of a powder of a thermoplastic material in a thin layer of raw elastomeric material;
   applying the functionalized elastomeric material layer onto a main layer of the elastomeric material;
   fusing the functionalized elastomeric material layer with the main layer of the elastomeric material during a step of vulcanization of both the functionalized elastomeric material layer and the main layer of the elastomeric material under pressure; and
   welding a thermoplastic composite material of the thermoplastic matrix composite to the functionalized elastomeric material layer.

2. The method as claimed in claim 1, wherein the step of functionalizing comprises the steps of:
   cleaning various parts of a vulcanizing mold;
   preparing a pre-functionalized thin layer of raw elastomer by incorporating homogeneously the predetermined proportion of the powder of the thermoplastic material in the pre-functionalized thin layer of elastomer;
   applying the pre-functionalized thin layer of raw elastomer on a surface of the elastomeric material;
   vulcanizing the elastomeric material under a pressure so that the pre-functionalized thin layer of raw elastomer becomes incorporated in the main layer of the elastomeric material, at least at the surface, during the vulcanizing process.

3. The method as claimed in claim 1, further comprising the step of selecting the thermoplastic material incorporated in the thin layer of the raw elastomeric that is both weldable to a thermoplastic material forming the thermoplastic matrix composite and compatible with the elastomeric material.

4. The method as claimed in claim 3, wherein the thermoplastic material incorporated in the thin layer of raw elastomeric material is identical to the thermoplastic material forming the thermoplastic matrix composite.

5. The method as claimed in claim 1, wherein the thermoplastic composite material is a carbon/polyetheretherketone composite; wherein the elastomeric material is of a hydrogenated nitrile butadiene rubber type; and wherein the thermoplastic material incorporated in the thin layer of raw elastomeric material is a polyetherimide.

6. The method as claimed in claim 5, further comprising the step of incorporating the thermoplastic material in the raw elastomeric material in a form of particles with a diameter between 20 μm and 60 μm, in a proportion between 10% and 25% of the mixture by weight.

7. The method as claimed in claim 1, wherein the step of welding comprises the steps of heating faying surfaces of two materials to be welded by interposing a woven metal wire cloth between the faying surfaces of the two materials, the woven metal wire cloth functions as a heating resistance and the woven metal wire cloth is impregnated with a thermoplastic material.

8. The method as claimed in claim 7, further comprising the step of preparing the faying surfaces of the two materials to be assembled prior to the step of welding.

9. The method of claim 8, wherein the step of preparing comprises the steps of degreasing using a solvent, and cleaning the faying surfaces of the two materials with the solvent.

10. The method of claim 8, wherein the step of preparing comprises the steps of grinding a functionalized surface of the elastomeric material forming the elastomer, and cleaning the surface of the functionalized layer with a solvent.

11. The method as claimed in claim 1, wherein the thermoplastic composite material is a carbon/polyetheretherketone composite; wherein the elastomeric material is of a hydrogenated nitrile butadiene rubber type; and wherein the step of functionalizing the elastomeric material comprises the steps of:
    setting up the following elements on a bottom plate of a vulcanizing mold and covering the elements with a top plate of the vulcanizing mold to provide a stack:
        a first set of two superposed layers of Teflon-coated glass cloth;
        a sheet of raw elastomeric material in which a polyetherimide powder has been incorporated therein;
        sheets of unvulcanized raw elastomeric material;
        a set of edging blocks; and
        a second set of two superposed layers of Teflon-coated glass cloth; and
    placing the stack on plate of a heating press preheated to a temperature $\theta_2$ of 140° C.;
    hot pressing the stack by applying a nominal pressing cycle of the elastomer in question is applied;
    removing the vulcanizing mold from the heating press which maintains the temperature $\theta_2$ of 140° C.; and
    removing the functionalized layer of elastomeric material from the vulcanizing mold to cool to a room temperature.

12. The method as claimed in claim 11, wherein the nominal pressing cycle comprises:
    a phase of gradual increase in temperature to a high temperature $\theta_1$ of 230° C. at a gradient of 2.5° C./min;
    a phase of maintaining a temperature $\theta_1$ for 10 minutes; and
    a phase of temperature decrease to the temperature $\theta_2$ of 140° C. at a gradient of 2.5° C./min.

13. The method as claimed in claim 1, wherein the thermoplastic composite material is a carbon/polyetheretherketone composite; wherein the elastomeric material is of a hydrogenated nitrile butadiene rubber type, and wherein the step of welding comprises the steps of:
    setting up and arranging the following elements in order on a plate of heat-insulating material to provide a stack:
        a first film of heat-resistant polyimide;
        the functionalized elastomeric material;
        a first film of polyetherimide;
        a woven metal wire cloth pre-impregnated with polyetherimide;
        a second film of polyetherimide;
        the thermoplastic composite material;
        a second film of heat-resistant polyimide;
        a layer of heat-insulating material; and
        a glass cloth;
    producing a bladder under a vacuum with a third film of heat-resistant polyimide arranged to allow the woven metal wire cloth to stand out and ensuring a hermeticity of the bladder by a high-temperature mastic;
    placing the bladder under the vacuum, connecting an electric power supply unit to the woven metal wire cloth, and applying different values of current according to a predetermined cycle;
    removing the third film of heat-resistant polyimide serving as a vacuum enclosure and dismounting the stack.

14. The method as claimed in claim 13, further comprising the steps of applying a current of 15.6 amps to the woven metal wire cloth for 200 seconds, and then applying a current of 10 amps to the woven metal wire cloth for 100 seconds.

* * * * *